US012651054B2

(12) United States Patent
Jeansonne et al.

(10) Patent No.: US 12,651,054 B2
(45) Date of Patent: Jun. 9, 2026

(54) SHARED SECRET KEY BASED ON SYSTEM COMPONENTS

(71) Applicant: Hewlett-Packard Development Company, L.P., Spring, TX (US)

(72) Inventors: Jeffrey Kevin Jeansonne, Spring, TX (US); Adrian Laurence Shaw, Bristol (GB); Richard Alden Bramley, Jr., Mansfield, MA (US); Christopher Ian Dalton, Bristol (GB); Joshua Serratelli Schiffman, Washington, DC (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 79 days.

(21) Appl. No.: 18/913,534

(22) Filed: Oct. 11, 2024

(65) Prior Publication Data

US 2026/0105138 A1     Apr. 16, 2026

(51) Int. Cl.
*G06F 21/44* (2013.01)
*G06F 21/70* (2013.01)
*H04L 9/08* (2006.01)
*G06F 21/57* (2013.01)

(52) U.S. Cl.
CPC .............. *G06F 21/44* (2013.01); *G06F 21/70* (2013.01); *H04L 9/0816* (2013.01); *H04L 9/085* (2013.01); *G06F 21/575* (2013.01); *H04L 9/0897* (2013.01)

(58) Field of Classification Search
CPC ........ G06F 21/44; G06F 21/70; G06F 21/575; H04L 9/0816; H04L 9/085; H04L 9/0897
See application file for complete search history.

(56) References Cited

U.S. PATENT DOCUMENTS

| | | | |
|---|---|---|---|
| 8,245,053 B2 | 8/2012 | Hoang et al. | |
| 9,230,109 B2 | 1/2016 | Wooten | |
| 2005/0289343 A1 | 12/2005 | Tahan | |
| 2008/0163383 A1* | 7/2008 | Kumar .................... | G06F 21/57 |
| | | | 726/29 |
| 2010/0088523 A1 | 4/2010 | Wooten | |
| 2010/0202609 A1* | 8/2010 | Sandhu ................. | H04L 9/0825 |
| | | | 380/28 |
| 2010/0217986 A1* | 8/2010 | Schneider ............. | H04L 9/3242 |
| | | | 380/279 |

(Continued)

FOREIGN PATENT DOCUMENTS

EP          4300335 A1     1/2024

*Primary Examiner* — Robert B Leung
(74) *Attorney, Agent, or Firm* — Quarles & Brady LLP

(57) ABSTRACT

Systems and methods for establishing a shared secret (or pre-shared key (PSK)) between a Chipset and a trusted platform module (TPM) of a computing device that can be used to encrypt all communication between those two components. The PSK may include two (or more) factors that must both be available to the Chipset in order to communicate with the TPM. The first factor may originate from an Endpoint Security Controller (EpSC) and the second factor may originate from within the Chipset. The PSK may only be regenerated by combining multiple segments of a key, referred to as "factors," that may be separately assigned to different components of a computing device. If all factors are not provided to a TPM upon boot-up, communication between the Chipset and the TPM may be disabled.

20 Claims, 5 Drawing Sheets

(56)                     References Cited

U.S. PATENT DOCUMENTS

| | | | | |
|---|---|---|---|---|
| 2010/0332852 | A1* | 12/2010 | Vembu | H04L 9/0841 |
| | | | | 380/283 |
| 2018/0152454 | A1* | 5/2018 | Kwon | H04L 63/045 |
| 2018/0241549 | A1* | 8/2018 | An | H04L 9/0866 |
| 2020/0353167 | A1* | 11/2020 | Vivek | G16H 10/60 |
| 2022/0253537 | A1* | 8/2022 | Yao | H04W 12/47 |
| 2023/0421362 | A1 | 12/2023 | Gorski | |
| 2024/0388421 | A1* | 11/2024 | Augustyn | H04L 9/0825 |

* cited by examiner

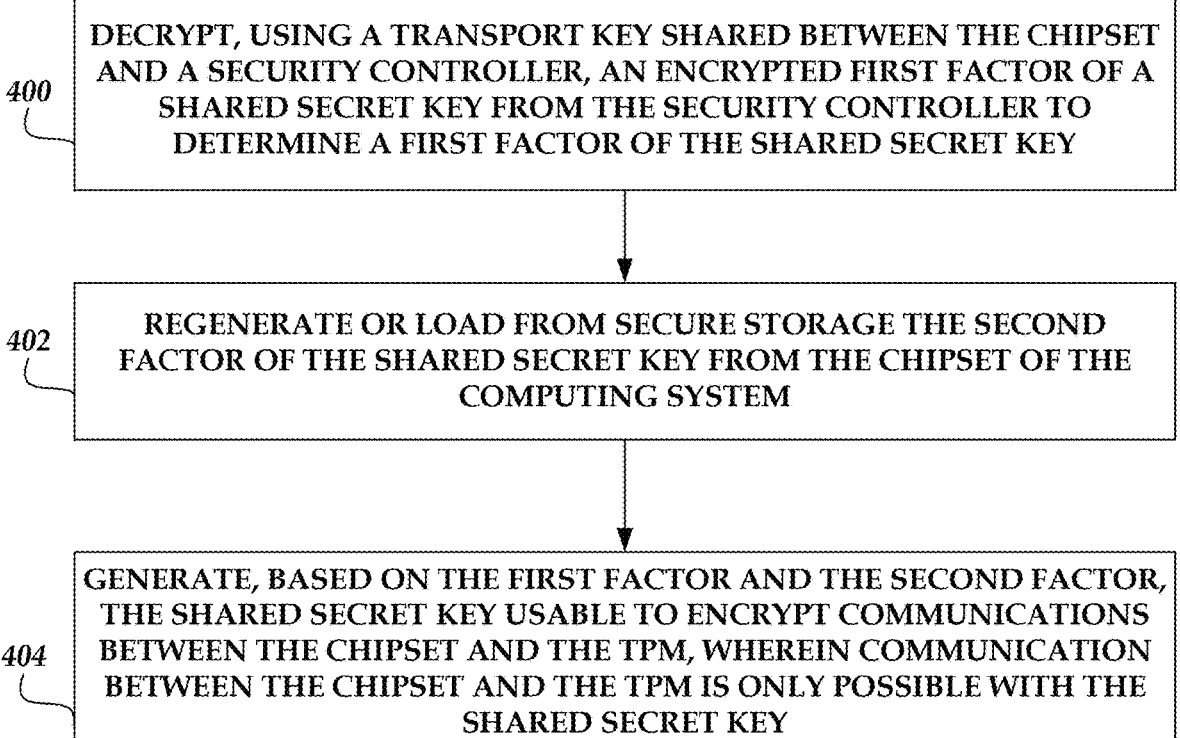

*400* DECRYPT, USING A TRANSPORT KEY SHARED BETWEEN THE CHIPSET AND A SECURITY CONTROLLER, AN ENCRYPTED FIRST FACTOR OF A SHARED SECRET KEY FROM THE SECURITY CONTROLLER TO DETERMINE A FIRST FACTOR OF THE SHARED SECRET KEY

*402* REGENERATE OR LOAD FROM SECURE STORAGE THE SECOND FACTOR OF THE SHARED SECRET KEY FROM THE CHIPSET OF THE COMPUTING SYSTEM

*404* GENERATE, BASED ON THE FIRST FACTOR AND THE SECOND FACTOR, THE SHARED SECRET KEY USABLE TO ENCRYPT COMMUNICATIONS BETWEEN THE CHIPSET AND THE TPM, WHEREIN COMMUNICATION BETWEEN THE CHIPSET AND THE TPM IS ONLY POSSIBLE WITH THE SHARED SECRET KEY

*FIG. 4*

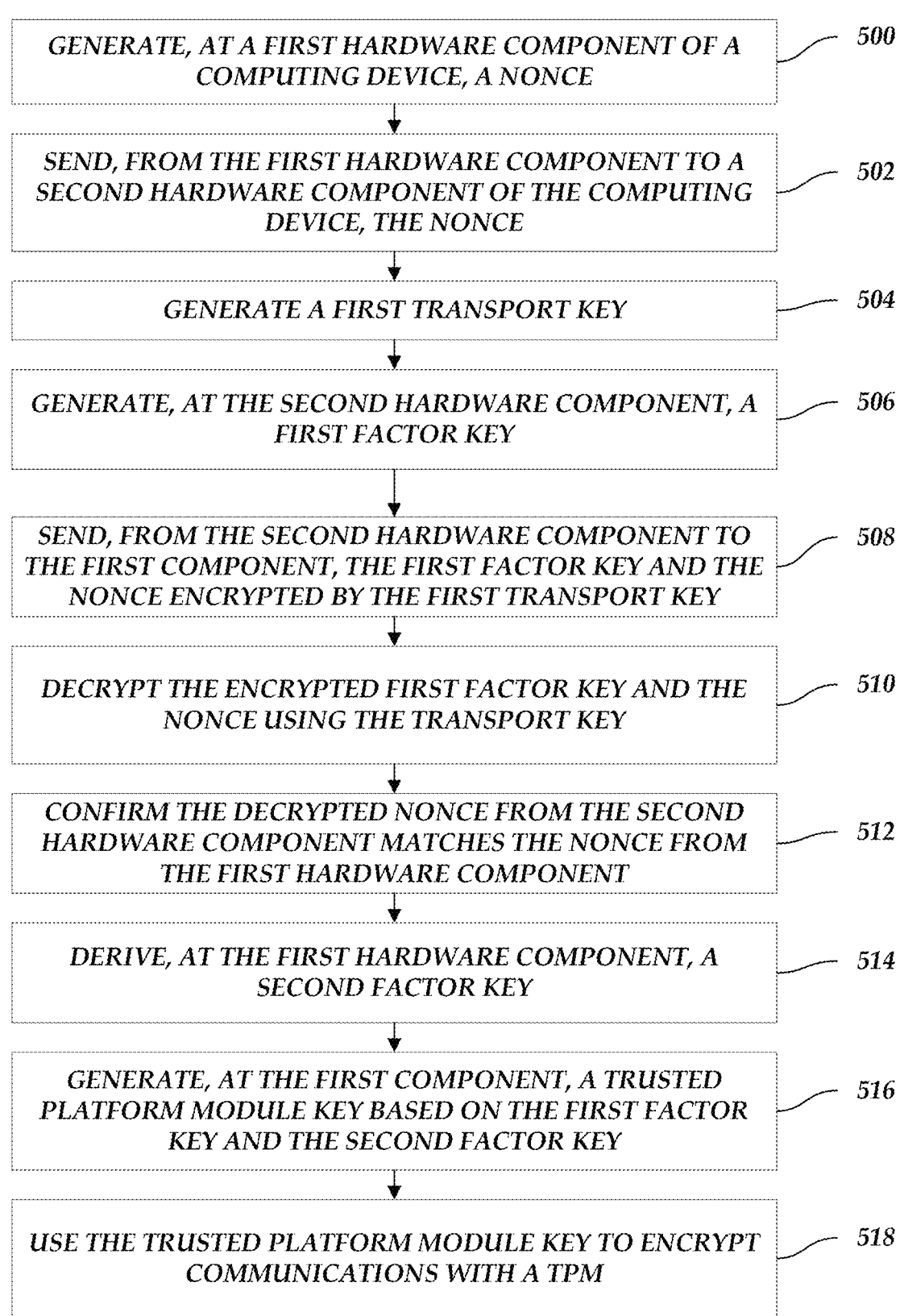

GENERATE, AT A FIRST HARDWARE COMPONENT OF A COMPUTING DEVICE, A NONCE — 500

SEND, FROM THE FIRST HARDWARE COMPONENT TO A SECOND HARDWARE COMPONENT OF THE COMPUTING DEVICE, THE NONCE — 502

GENERATE A FIRST TRANSPORT KEY — 504

GENERATE, AT THE SECOND HARDWARE COMPONENT, A FIRST FACTOR KEY — 506

SEND, FROM THE SECOND HARDWARE COMPONENT TO THE FIRST COMPONENT, THE FIRST FACTOR KEY AND THE NONCE ENCRYPTED BY THE FIRST TRANSPORT KEY — 508

DECRYPT THE ENCRYPTED FIRST FACTOR KEY AND THE NONCE USING THE TRANSPORT KEY — 510

CONFIRM THE DECRYPTED NONCE FROM THE SECOND HARDWARE COMPONENT MATCHES THE NONCE FROM THE FIRST HARDWARE COMPONENT — 512

DERIVE, AT THE FIRST HARDWARE COMPONENT, A SECOND FACTOR KEY — 514

GENERATE, AT THE FIRST COMPONENT, A TRUSTED PLATFORM MODULE KEY BASED ON THE FIRST FACTOR KEY AND THE SECOND FACTOR KEY — 516

USE THE TRUSTED PLATFORM MODULE KEY TO ENCRYPT COMMUNICATIONS WITH A TPM — 518

*FIG. 5*

SHARED SECRET KEY BASED ON SYSTEM COMPONENTS

BACKGROUND

In a computing device, a trusted platform module (TPM) may be used to secure the computing hardware. The TPM may communicate with the Chipset of the device, which in turn may communicate with other components of the computing device, such as memory, sound cards, video cards, hardware chips, etc.

BRIEF DESCRIPTION OF THE DRAWINGS

Throughout the drawings, reference numbers are re-used to indicate correspondence between referenced elements. The drawings are provided to illustrate examples of the subject matter described herein and not to limit the scope thereof.

FIG. 4 depicts a flowchart of an example process to generate a shared secret key to encrypt communications between a chipset and the TPM in accordance with some examples of the present disclosure.

FIG. 5 depicts a flowchart of an example process to generate a TPM key based on a first factor key and a second factor key in accordance with some examples of the present disclosure.

DETAILED DESCRIPTION

Figure 1:
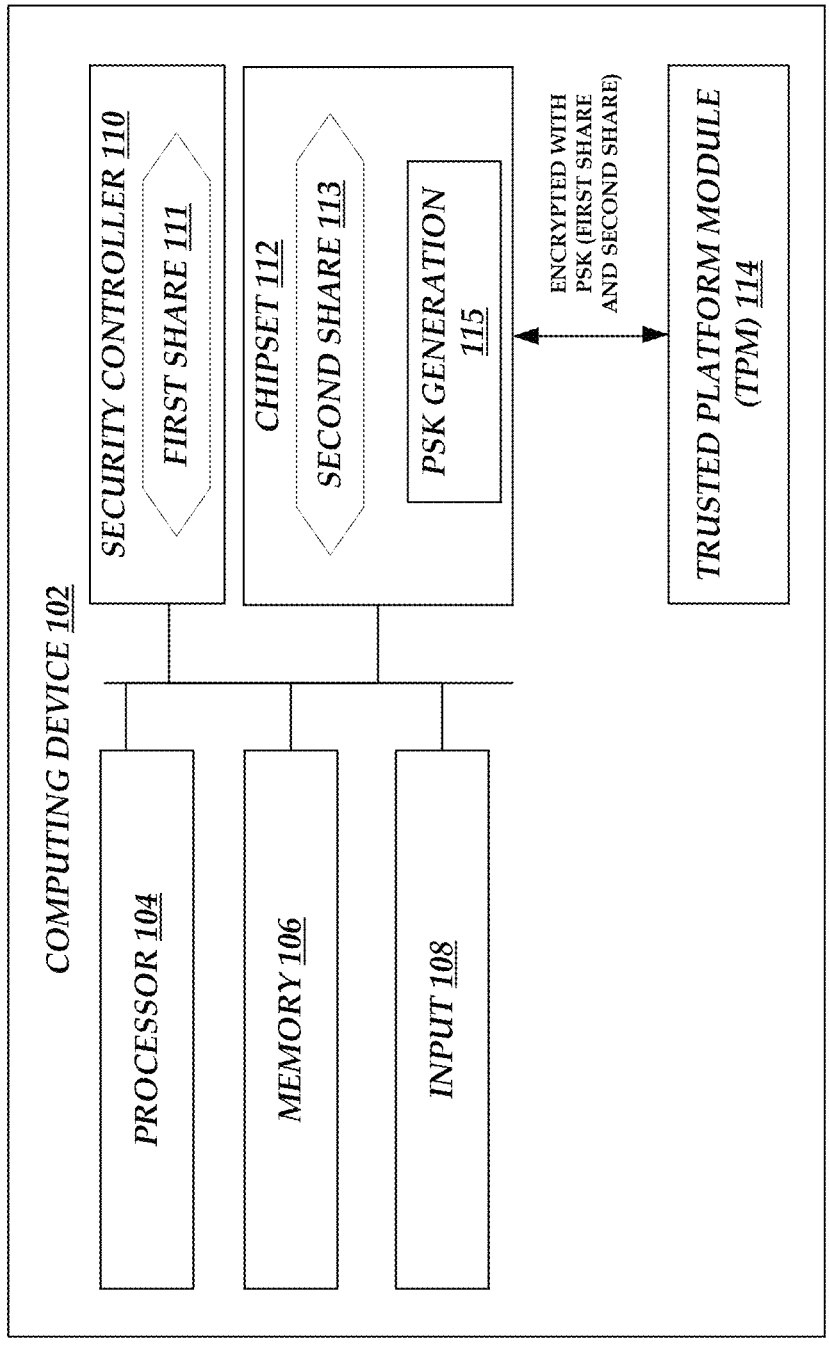
FIG. 1 illustrates a block diagram of an example computing device in which examples of the present disclosure may be implemented.

The TPM may be susceptible to attack when a component is removed and replaced with a malicious component. Currently, no method exists to create a secure logical binding between separately packaged discrete critical system components in a computing device that can provide a mitigation for attacks that attempt to physically replace or remove one or more of those components. These attacks may attempt to compromise the system, such as by removing one or more of the system components in an attempt to compromise those components external to the system (e.g., an off-line attack). For example, an attacker may remove a component from a computing device's motherboard and replace the component with a different component from another machine. That different component may be used to inappropriately access data and information in the TPM, such as a key held on the TPM that allows access to user data on a hard drive. The systems and methods described herein address this vulnerability by providing an approach to achieve that binding without compromising serviceability or adding risk of catastrophic failure due to loss of non-volatile (flash) memory.

The systems and methods described herein may include establishing a shared secret (or pre-shared key (PSK)) between a Chipset and a trusted platform module (TPM) of a computing device that can be used to encrypt all communication between those two components. The PSK may include two (or more) segments of a key (referred to herein as "factors") that must both be available to the Chipset in order to communicate with the TPM. These factors may be separately assigned to different components of a computing device. If all factors are not provided to the Chipset upon boot-up, communication between the Chipset and the TPM may be disabled. In one example, a first factor comes from the Endpoint Security Controller (EpSC) and the second factor comes from within the Chipset. The Chipset may then regenerate the PSK by combining the first and second factors, and the PSK may be used to enable communications between the Chipset and TPM. The quantity of factors may be scalable based on the number of components (e.g., two factors for two components, three factors for three components, etc.).

The systems and methods of the present disclosure may provide one or more of several advantages, including: securing the TPM against offline attacks if the TPM were removed from the system, securing communications between the Chipset and the TPM, securing communication of the EpSC PSK factor to the Chipset, and/or enabling the EpSC to control whether or not the TPM is available to the system for features, such as Firmware lock where the system is temporarily locked under control of the EpSC. Furthermore, the systems and methods described herein may eliminate (or reduce) the possibility of the EpSC or Chipset losing flash memory state and being unable communicate with the TPM, since both root all required secrets stored in One Time Programmable memory. The systems and methods described herein may also provide flexibility for service to rebind alternative EpSC and/or Chipset components via the described secured process. In addition, the systems and methods described herein may provide a mechanism to prevent the EpSC binding to a man-in-the-middle (MITM) or attacker-controlled chipset.

The systems and methods describe herein also may provide a low overhead method for typical operation and therefore may reduce computing costs. Furthermore, the system can leverage existing one-time-password (OTP) seed storage in the EpSC and/or Chipset and does not request allocating new OTP storage for this use case.

The initial provisioning of the factors may occur in a secure factory environment, where the Chipset may generate a unique key pair and a nonce and send those to the EpSC. The nonce may be an arbitrary number that can be used in cryptographic communication, such as a random 32 byte nonce. The EpSC can generate another unique key pair and derive a transport key (TK) based on its unique key pair and the public key from the Chipset. The EpSC can generate a PSK first factor and send the encrypted (using the TK) first factor to the Chipset. The Chipset can decrypt the payload and generate its own PSK second factor. These two factors allow the Chipset to create the TPM PSK, which can enable secure communications between the Chipset and the TPM.

In normal operation (e.g., upon booting up the computing device), the TPM PSK is reconstructed by the Chipset to enable communications with the TPM. That process involves the EpSC re-deriving the PSK first factor/TPM password from its secret key, loading the TK from internal flash and encrypting PSK first factor, TPM password, system provisioning state, and a fresh nonce from the Chipset with TK. After the Chipset rederives the PSK second factor from its secret key, the Chipset combines both factors to reconstitute the TPM PSK. This process can be performed between any two components of the computing system resulting in N number of factors, where the PSK cannot be recreated without all N number of factors.

Example Secret Key Sharing

FIG. 1 illustrates a block diagram of an example computing device 102 in which examples of the present disclosure may be implemented. The computing device 102 may include a processor 104, memory 106, input/output 108, a security controller 110, a chipset 112, and a trusted platform module (TPM) 114. The security controller 110 may include a first share 111. The Chipset 112 may include a second share 113 and PSK generation 115. The first share 111 and the second share 113 may also be referred to as "factors" and may be derived from a transport key, which will be described in further detail below. The PSK generation 115 may generate a PSK based on the first share 111 and the second share 113. The PSK can be used to encrypt communications between the Chipset 112 and the TPM 114. The chipset 112 may be in communication with the security controller 110 and the TPM 114 to generate the PSK that allows communication between the chipset 112 and the TPM 114. In other examples, the computing device may also include other hardware components, such as memory, sound card, video card, or hardware chip. These other hardware components may also be associated with a factor or share of the PSK, such that removal or modification of the hardware component may prevent regeneration of the PSK by the Chipset 112 and communications between the Chipset 112 and TPM 114.

Figure 2:
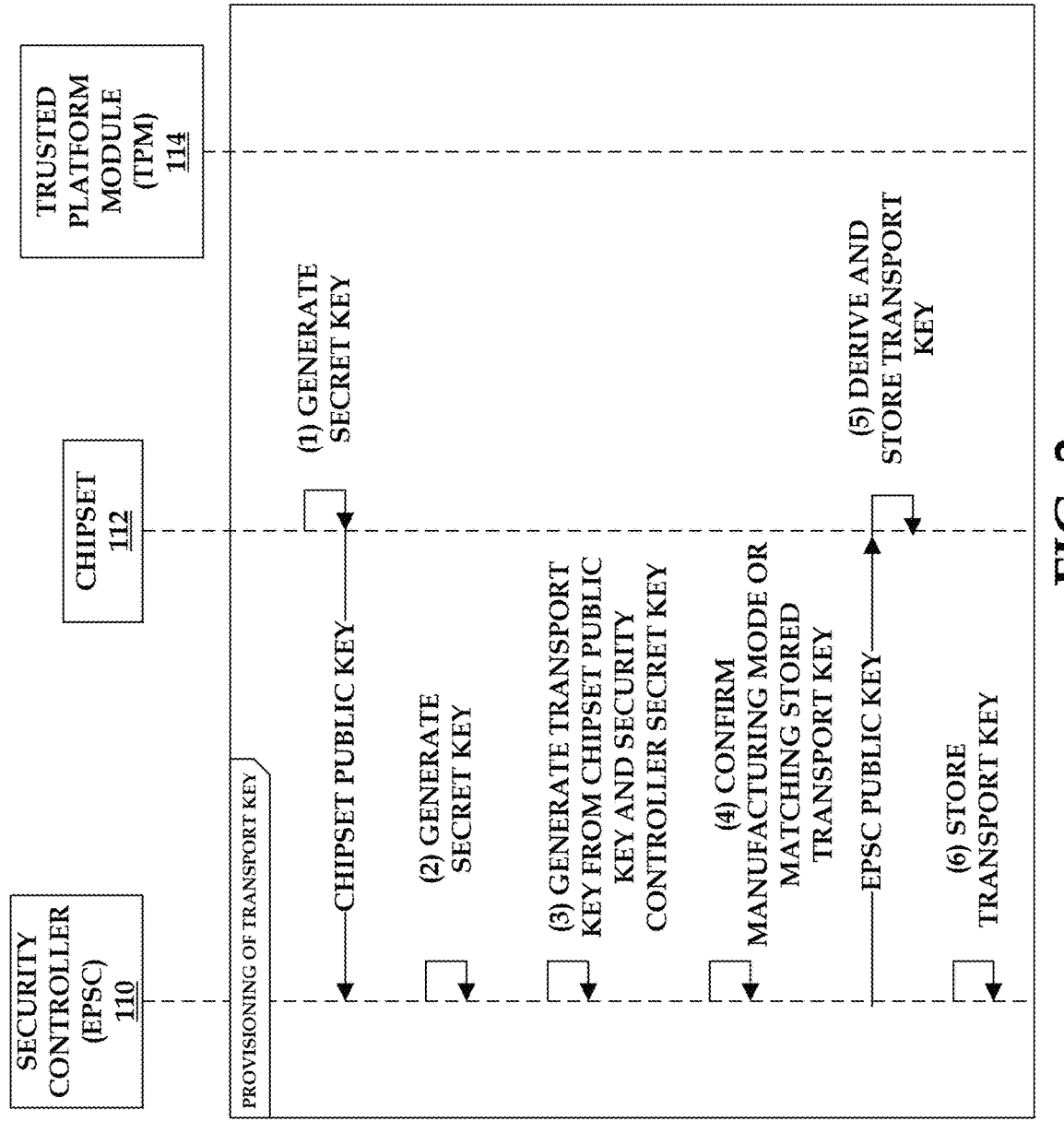
FIG. 2 illustrates an example diagram of components of the example computing device of FIG. 1 provisioning a transport key in accordance with some examples of the present disclosure.

FIG. 2 illustrates an example diagram of components of the example computing device 102 of FIG. 1 provisioning a transport key in accordance with some examples of the present disclosure. The initial provisioning may occur in a secure factory environment, where a Chipset 112 may generate a unique key pair and a nonce and send the key pair and the nonce to a Security Controller (EpSC) 110. The EpSC 110 can generate another unique key pair and derive a transport key (TK) based on its unique key pair and the public key from the Chipset 112. The EpSC 110 can generate a PSK first factor and send the encrypted (using the TK) first factor to the Chipset 112 in a payload. The Chipset 112 can decrypt the payload and generate its own PSK second factor. These two factors allow the Chipset 112 to create a trusted platform module (TPM) PSK, which can enable secure communications between the Chipset 112 and a TPM 114. Depending on the embodiment, the example process of FIG. 2 may include fewer or additional actions and/or the actions may be performed in an order different than illustrated.

As shown in FIG. 2, at (1), the Chipset 112 can first generate a secret key. For example, the Chipset 112 can generate a unique asymmetric key pair from a root secret stored in one-time-programmable, immutable memory. The Chipset 112 may then generate a nonce and send the nonce and an asymmetric public key to the EpSC 110.

At (2), the EpSC 110 can generate a secret key. For example, the EpSC 110 may generate a unique asymmetric key pair from a root secret stored in one-time-programmable, immutable memory. The private key from the EpSC 110 and the public key from the Chipset 112 can then be used to derive a transport key (TK).

At (3), the EpSC 110 may generate the transport key (TK) from the private key from the EpSC 110 and the public key from the Chipset 112. In some embodiments, the TK may be derived using the Diffie Helman Key Exchange protocol. The EpSC 110 may encrypt its public key using the TK and send the encrypted public key via a payload to the chipset 112. In some embodiments, the EpSC 110 may also generate the PSK first factor and a TPM password from the same root secret stored in one-time-programmable, immutable memory. The password may be 32 bytes generated from the existing secret key. The PSK first factor, the nonce from the Chipset 112, a provisioning state of the EpSC 110 (e.g., whether the device is in manufacturing mode), and a TPM password may be encrypted using the TK and sent to the Chipset 112 along with the public key from the EpSC 110.

At (4), the EpSC 110 may confirm the device is in manufacturing mode or the generated transport key matches a stored transport key. Manufacturing mode may indicate that the device is in a state that allows provisioning of the transport key. For example, manufacturing mode may be a state of the device when the device is initially being built in a factory. The stored transport key may be a transport key that was generated on previous instances of the provisioning of the transport key, such as through the process described in (5) below.

At (5), the Chipset 112 may derive and store the TK. For example, the Chipset 112 may use the private key of the previously generated asymmetric key pair and the public key from the EpSC 110 to derive the TK which it may use to decrypt the payload. If the decrypted payload contains the same nonce sent by the Chipset 112, the EpSC 110 commits the TK to flash memory (encrypted with a secret specific to that Chipset 112 to protect the TK confidentiality). For example, the Chipset TK may be stored securely in external flash protected from deletion attack (e.g., the TK can be re-established securely).

At (6), the EpSC 110 may also store the TK. For example, the EpSC 110 may also commit the TK to its internal flash memory when it receives a success from the Chipset 112, which is protected in the same manner.

Once the TK is provisioned and stored, the system may subsequently generate the factors from the TK as part of a system boot process. For example, in some embodiments, the Chipset 112 may then generate a PSK second factor from the same root secret stored in one-time-programmable, immutable memory that was used to generate the Chipset 112 asymmetric key pair. These two PSK factors may be combined by the Chipset 112 to create a TPM PSK. If the TPM PSK is not already provisioned to the TPM 114, and the EpSC provisioning state indicates the system is in manufacturing mode, the Chipset 112 may send the TPM PSK to the TPM 114. For example, the Chipset 112 may send the TPM PSK to the TPM 114 via a "Set PSK" command. Once the PSK has been set in the TPM 114, secure communications between the Chipset 112 and the TPM 114 using the PSK can commence without revealing the PSK externally.

However, the Chipset 112 may not perform the "Set PSK" operation on an unconfigured TPM 114 if the payload from the EpSC 110 indicates that the system is not in manufacturing mode. This prevents an adversary, e.g., outside of the manufacturing environment, from replacing the TPM 114 with an un-provisioned TPM 14 or a TPM emulator in an attempt to get the Chipset 112 to reveal the PSK key.

Figure 3:
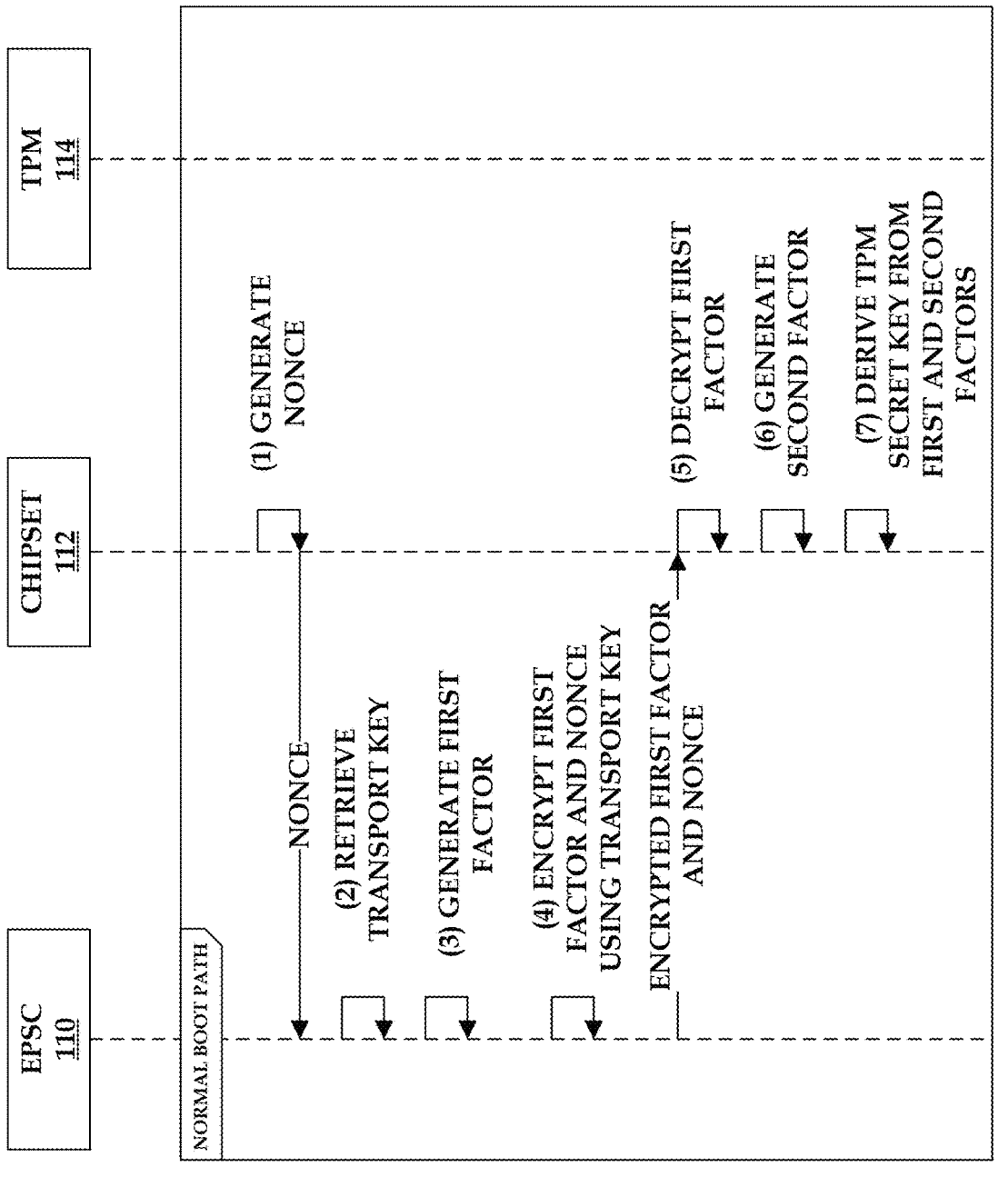
FIG. 3 illustrates an example diagram of components of the example computing device of FIG. 1 deriving a trusted platform module (TPM) key in accordance with some examples of the present disclosure.

FIG. 3 illustrates an example diagram of components of the example computing device 102 of FIG. 1 deriving a trusted platform module (TPM) key in accordance with some examples of the present disclosure. FIG. 3 depicts an example of the process of deriving the TPM key when the computing device is proceeding with a normal boot path (e.g., upon start-up of the computing device).

In normal operation, the TPM PSK may be constructed by the Chipset 112 to enable communications with the TPM 114 on each boot. In some embodiments, the TPM PSK resides in the Chipset 112 volatile memory and may be reconstructed on each boot. Depending on the embodiment, the example process of FIG. 3 may include fewer or additional actions and/or the actions may be performed in an order different than illustrated.

At (1), the Chipset 112 may generate a fresh nonce and send the new nonce to the EpSC 110. Then, at (2), the EpSC 110 may retrieve the transport key (e.g., from memory or secure storage). The transport key may be stored in memory, such as the transport key derived and stored during the provisioning phase as shown and described in FIG. 2. The EpSC 110 may also verify whether the device is currently in manufacturing mode. If the device is not in manufacturing mode, then the process may be aborted and the device may return to the process as described in FIG. 2. Alternatively, the EpSC 110 may also abort the process if it determines that the exact same chipset is requesting the transport key.

At (3), the EpSC 110 may generate a first factor. The first factor may be re-derived from the secret key (e.g., OTP seed). Then, at (4), the EpSC 110 may encrypt the first factor and nonce using the transport key. The process may involve the EpSC 110 deriving the PSK first factor and/or TPM password from an OTP seed (e.g., secret key), loading the TK from the internal flash memory and encrypting the PSK first factor, TPM password, system provisioning state, and the fresh nonce from the Chipset 112 with the TK. The EpSC 110 may then send the encrypted first factor and nonce to the Chipset 112.

At (5), the Chipset 112 may decrypt the first factor sent from the EpSC 110. The Chipset 112 may also load its copy of the TK from flash memory (e.g., as the TK stored as shown and described in FIG. 2) and use the TK to decrypt the payload from the EpSC 110. The Chipset 112 may also confirm the nonce matches what was provided to the EpSC 110.

At (6), the Chipset 112 can generate a second factor. The Chipset 112 may generate the second factor by deriving the second factor from the Chipset 112 secret key (e.g., OTP seed).

At (7), the Chipset 112 may derive a TPM secret key (TPM PSK) from the first and second factors. After the Chipset 112 derives the PSK second factor from the secret key, the Chipset 112 may combine both factors (e.g., the first factor from the EpSC 110 and the second factor from the Chipset 112) to construct the TPM PSK. Using symmetric key operations in normal operation can minimize latency to re-establish the TPM PSK and thus minimize boot time impact.

Additionally, in the event the TK in the Chipset 112 external flash memory may be deleted accidentally (or by an adversary) in the field, the Chipset 112 can execute the same provisioning flows as described above to re-obtain the TK from the EpSC 110 in a secure manner. The EpSC 110 may accept a request from the Chipset 112 using the same Chipset 112 asymmetric public key that was first established and may reject any attempt by an adversary to obtain the PSK first factor from the EpSC 110 using a request with adversary-controlled keys. In effect, the EpSC 110 authenticates the caller as the original Chipset 112. Since the EpSC 110 may store this configuration in internal tamper protected flash memory, the adversary is unable to delete that data.

For resilience purposes, the EpSC 110 can also re-bind to the Chipset 112 in the field in the unlikely event of a catastrophic failure that results in loss of the Chipset 112 binding information in internal EpSC 110 flash. In this scenario, the EpSC 110 may not authenticate the Chipset 112 as being the same as initial factory configuration. However, since there is not a known way for an adversary to force this type of failure, the risk may be minimized.

In some embodiments, it is also possible to rebind the EpSC 110 to a different Chipset 110 via a secure service process that returns the EpSC 110 back to manufacturing mode. However, if the TPM 114 was previously configured with a PSK, it may be preferred to replace it with a new TPM that has never been configured.

FIG. 4 depicts a flowchart of an example process to generate a shared secret key to encrypt communications between a chipset and a TPM in accordance with some examples of the present disclosure. Depending on the embodiment, the example process of FIG. 4 may include fewer or additional actions and/or the actions may be performed in an order different than illustrated.

The process begins at block 400 where the computing system may decrypt, using a transport key shared between the chipset and a security controller, an encrypted first factor of a shared secret key from the security controller of the computing system to determine a first factor of the shared secret key. The encrypted first factor may be generated from a root secret stored in memory. The encrypted first factor may additionally be decrypted using a nonce, where the nonce may be a random 32 byte nonce. The decryption process may be initiated as part of a normal boot process of the computing system. For example, upon start-up of a computing device.

The transport key may be generated as part of an initial provisioning process of the device, such as that shown and described in FIG. 2. For example, as described above, the transport key may be generated based on a secret key and a nonce from the Chipset. Once the transport key is generated, it may be stored at the computing device, or at each individual component, based on a determination that the decrypted nonce matches the nonce from the Chipset. The chipset may decrypt the nonce using the transport key, as described above with respect to FIG. 3.

At block 402, the computing system may regenerate or load from secure storage the second factor of the shared secret key from the chipset of the computing system. The Chipset may regenerate the second factor by deriving the second factor from the Chipset secret key. Alternatively, when the second factor was previously generated, the second factor may be stored in secure storage for loading at a later time.

At block 404, the computing system may generate, based on the first factor and the second factor, the shared secret key usable to encrypt communications between the Chipset and the TPM, wherein communication between the Chipset and the TPM is only possible with the shared secret key. For example, after the Chipset derives the PSK second factor from the secret key, the Chipset may combine both factors (e.g., from first factor from the EpSC and the second factor from the Chipset) to construct the TPM PSK.

In some embodiments, the computing device may further decrypt, using the second transport key shared between the Chipset and a hardware component of the computing system, an encrypted third factor of the shared secret key from the hardware component to determine a third factor of the shared secret key and generate, based on the first factor, the second factor, and the third factor, the shared secret key usable to encrypt communications between the Chipset and the TPM. In this case, the communication between the Chipset and the TPM is only possible with the shared secret key. The hardware component may include various types of hardware components, such as memory, sound card, video card, or hardware chip.

FIG. 5 depicts a flowchart of an example process to generate a TPM key based on a first factor key and a second factor key in accordance with some examples of the present disclosure. Depending on the embodiment, the example process of FIG. 5 may include fewer or additional actions and/or the actions may be performed in an order different than illustrated.

The process begins at block 500 where the computing device may generate, at a first hardware component of the computing device, a nonce. The nonce may be an arbitrary number that can be used in cryptographic communication, such as a random 32 byte nonce. The first hardware component of the computing device may be a Chipset. The example process may begin initiating the generating of the nonce as part of a normal boot process of the computing device.

At block 502, the computing device may send, from the first hardware component to a second hardware component of the computing device, the nonce. The second hardware component may be a security controller. However, other hardware components of the computing device, such as memory, sound card, video card, or hardware chip, may also be possible.

At block 504, the computing device may generate a first transport key. The computing device may generate the first transport key by retrieving it from memory, such as flash memory. The first transport key may be provisioned as part of an initial set up process, such as that shown and described in FIG. 2, and stored in memory for later use by the hardware components. At block 506, the computing device may generate, at the second hardware component, a first factor key. The first factor key may be generated following the process as shown and described in FIG. 3.

At block 508, the computing device may send, from second hardware component to the first component, the first factor key and the nonce encrypted by the first transport key. In some embodiments, a password and provisioning state may also be encrypted using the transport key. The password may be 32 bytes generated from the existing secret key. The provisioning state may indicate the system is in manufacturing mode.

At block 510, the computing device may decrypt the encrypted first factor key and the nonce using the transport key. For example, a chipset may load its copy of the transport key from flash memory and use it to decrypt a payload containing the first factor key and the nonce from a security controller.

At block 512, the computing device may confirm the decrypted nonce from the second hardware component matches the nonce from the first hardware component. For example, a chipset may decrypt the nonce provided in a payload from the security controller and the computing device may confirm that the decrypted nonce matches the nonce initially generated by the security controller (e.g., the nonce generated at block 500).

At block 514, the computing device may derive, at the first hardware component, a second factor key. For example, the first hardware component may derive the second factor key based on its OTP seed (e.g., Chipset secret key).

At block 516, the computing device may generate, at the first component, a trusted platform module key based on the first factor key and the second factor key. The trusted platform module key may be used to encrypt secure communications between the first hardware component and a trusted platform module. The trusted platform module key may not be derived with both the first factor key and the second factor key. As such, without both factor keys, there may be no communication between the trusted platform module and the hardware components.

At block 518, the computing device may use the trusted platform module key to encrypt communications with a Trusted Platform Module (TPM). For example, the trusted platform module key may be used to encrypt communications between a TPM and a computing device chipset.

Although this process is described with a first hardware component and a second hardware component, this is not meant to be limiting or required. For example, this process may also be performed with a first hardware component, a second hardware component, a third hardware component, and so on, such that the trusted platform module key may not be derived without each of the factors corresponding to each of the hardware components.

Terminology

It is to be understood that not necessarily all objects or advantages may be achieved in accordance with any particular example described herein. Thus, for example, those skilled in the art will recognize that some examples may be operated in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, some acts, events, or functions of any of the algorithms described herein can be performed in a different sequence, can be added, merged, or left out altogether (for example, not all described acts or events are necessary for the practice of the algorithms). Moreover, in some examples, acts or events can be performed concurrently, for example, through multi-threaded processing, interrupt processing, or multiple processors or processor cores, or on other parallel architectures, rather than sequentially. In addition, different tasks or processes can be performed by different machines and/or computing systems that can function together.

The various illustrative logical blocks and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combination of the same, or the like. A processor can include electrical circuitry to process computer-executable instructions. In some examples, a processor includes an FPGA or other programmable device that performs logic operations without processing computer-executable instructions. A processor can also be implemented as a combination of computing devices, for example, a combination of a DSP and a microprocessor, a plurality of microprocessors, microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the examples disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some examples, such processes or portions thereof may be implemented on multiple computing devices and/or multiple processors, serially or in parallel.

Conditional language such as, among others, "can," "could," "might" or "may," unless specifically stated otherwise, are otherwise understood within the context as used in general to convey that some examples include, while other examples do not include, some features, elements and/or steps. Thus, such conditional language is not generally intended to imply that features, elements and/or steps are in any way for examples or that examples necessarily include logic for deciding, with or without user input or prompting, whether these features, elements and/or steps are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that some examples require at least one of X, at least one of Y, or at least one of Z to each be present.

Any process descriptions, elements or blocks in the flow diagrams described herein and/or depicted in the attached figures should be understood as potentially representing modules, segments, or portions of code which include executable instructions for implementing specific logical functions or elements in the process. Alternate examples are included within the scope of the examples described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure.

Any process descriptions, elements or blocks in the flow diagrams described herein and/or depicted in the attached figures should be understood as potentially representing modules, segments, or portions of code which include executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A method of determining a shared secret key required for communication between a chipset and a trusted platform module (TPM) of a computing system, the method comprising:

decrypting, using a transport key shared between the chipset and a security controller of the computing system, an encrypted first factor of a shared secret key from the security controller to determine a first factor of the shared secret key;

regenerating or loading from a secure storage a second factor of the shared secret key from the chipset of the computing system; and generating, based on the first factor and the second factor, the shared secret key usable to encrypt communications between the chipset and the TPM, wherein communication between the chipset and the TPM is only possible with the shared secret key.

2. The method of claim 1, further comprising:

decrypting, using a second transport key shared between the chipset and a hardware component of the computing system, an encrypted third factor of the shared secret key from the hardware component to determine a third factor of the shared secret key; and generating, based on the first factor, the second factor, and the third factor, the shared secret key usable to encrypt communications between the chipset and the TPM, wherein communication between the chipset and the TPM is only possible with the shared secret key.

3. The method of claim 1, wherein the encrypted first factor is generated from a root secret stored in memory.

4. The method of claim 1, further comprising: initiating the decrypting as part of a normal boot process of the computing system.

5. The method of claim 1, wherein the encrypted first factor is decrypted further using a nonce.

6. The method of claim 5, wherein the nonce is a random 32 byte nonce.

7. A method, comprising:

generating a first transport key;

generating, at a first hardware component of a computing device, a first factor sending, from the first hardware component to a second hardware component of the computing device, the first factor key encrypted by the first transport key;

decrypting the encrypted first factor key using the first transport key;

deriving, at the second hardware component, a second factor key;

generating, at the second hardware component, a trusted platform module key based on the first factor key and the second factor key; and using the trusted platform module key to encrypt communications with a trusted platform module of the computing device.

8. The method of claim 7, further comprising: initiating the generating of the first transport key as part of a normal boot process of the computing device.

9. The method of claim 7, further comprising:

generating, at the second hardware component of the computing device, a nonce;

sending, from the second hardware component to the first hardware component, the nonce encrypted by the first transport key;

decrypting the encrypted nonce using the first transport key; and confirming the decrypted nonce from the first hardware component matches the nonce from the second hardware component.

10. The method of claim 7, wherein the trusted platform module key is used to encrypt secure communications between the second hardware component and the trusted platform module.

11. A non-transitory computer readable medium having instructions stored thereon, the instructions executable by a processor of a computing device to cause the computing device to:

decrypt, using a transport key shared between a chipset and a security controller of a computing device, an encrypted first factor of a shared secret key from the security controller to determine a first factor of the shared secret key;

regenerate or load from secure storage a second factor of the shared secret key from the chipset of the computing device;

regenerate or load from secure storage a third factor of the shared secret key from a hardware component of the computing device; and generate, based on the first factor, the second factor, and the third factor, the shared secret key usable to encrypt communications between the chipset and a trusted platform module (TPM), wherein communication between the chipset and the TPM is only possible with the shared secret key.

12. The non-transitory computer readable medium of claim 11, wherein the encrypted first factor is generated from a root secret stored in memory.

13. The non-transitory computer readable medium of claim 11, wherein the computing device is starting up in normal boot mode.

14. The non-transitory computer readable medium of claim 11, wherein the encrypted first factor is decrypted further using a nonce.

15. The non-transitory computer readable medium of claim 14, wherein the nonce is a random 32 byte nonce.

16. The non-transitory computer readable medium of claim 11, wherein the hardware component comprises one of: memory, sound card, video card, or hardware chip.

17. The non-transitory computer readable medium of claim 11, wherein the transport key is derived using a Diffie-Hellman key exchange protocol.

18. The non-transitory computer readable medium of claim 11, wherein the transport key is generated based on a secret key and a nonce from the chipset.

19. The non-transitory computer readable medium of claim 18, wherein the chipset decrypts the nonce using the transport key.

20. The non-transitory computer readable medium of claim 19, wherein the transport key is stored at the computing device based on a determination that the decrypted nonce matches the nonce from the chipset.

* * * * *